June 27, 1967 J. W. OZYMY 3,327,616
BARBECUE OVEN
Filed Nov. 13, 1964 5 Sheets-Sheet 1

John W. Ozymy
INVENTOR.

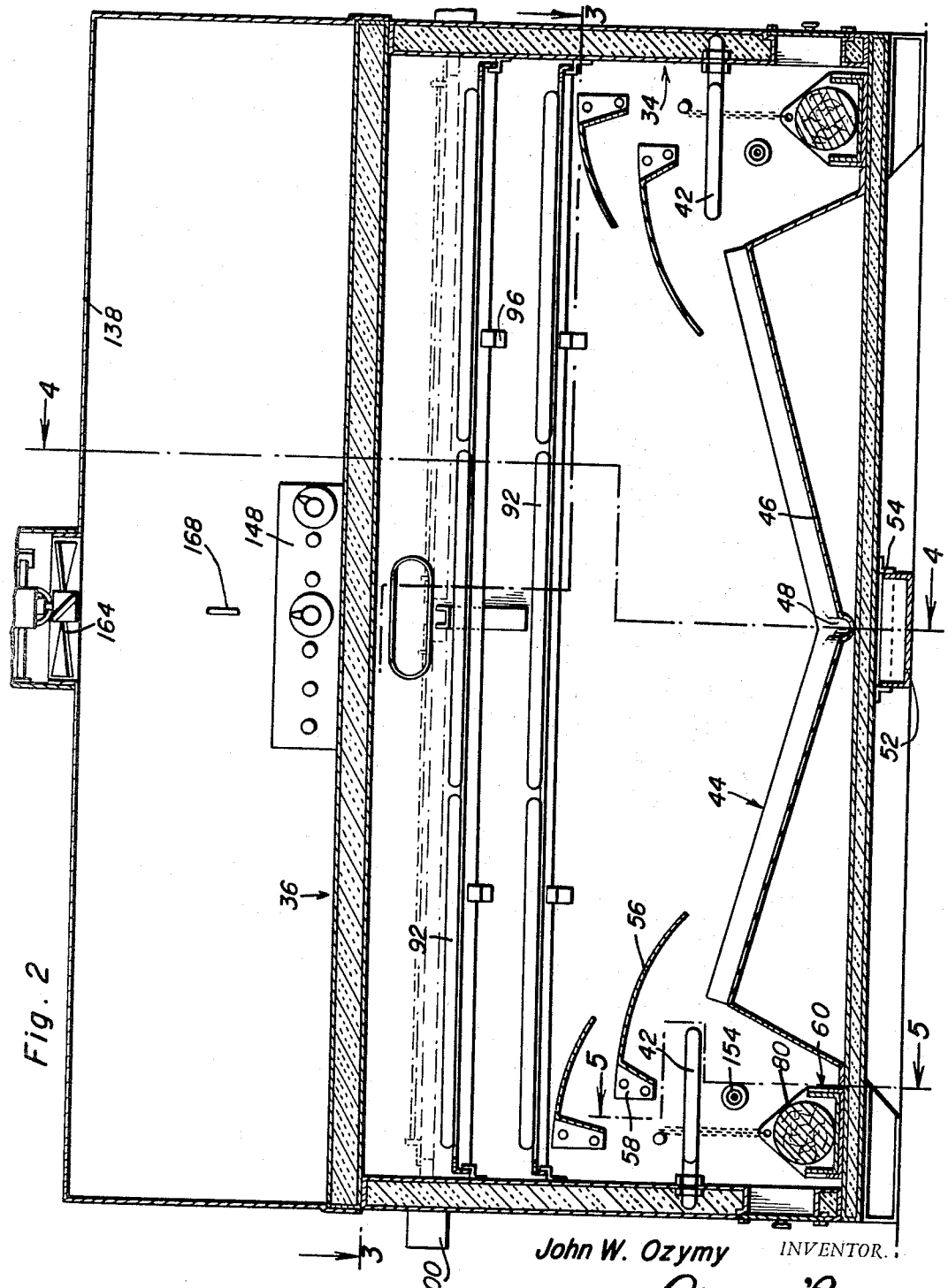

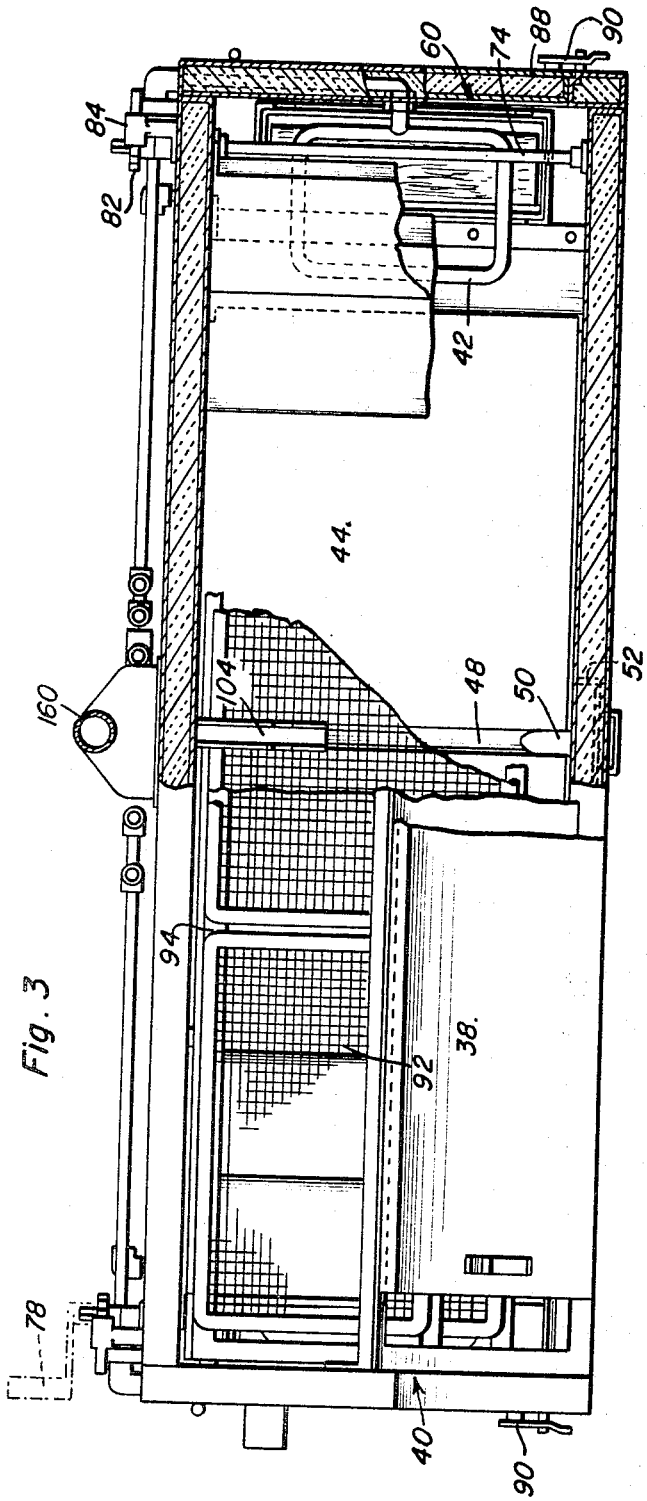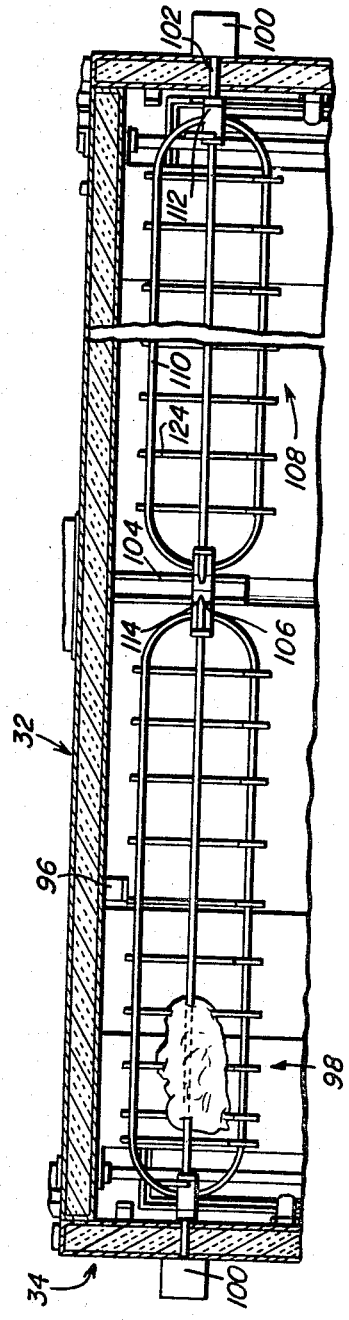

June 27, 1967 J. W. OZYMY 3,327,616
BARBECUE OVEN
Filed Nov. 13, 1964 5 Sheets-Sheet 4

John W. Ozymy
INVENTOR.

BY Clarence A. O'Brien
and Harvey B. Jacobson
Attorneys

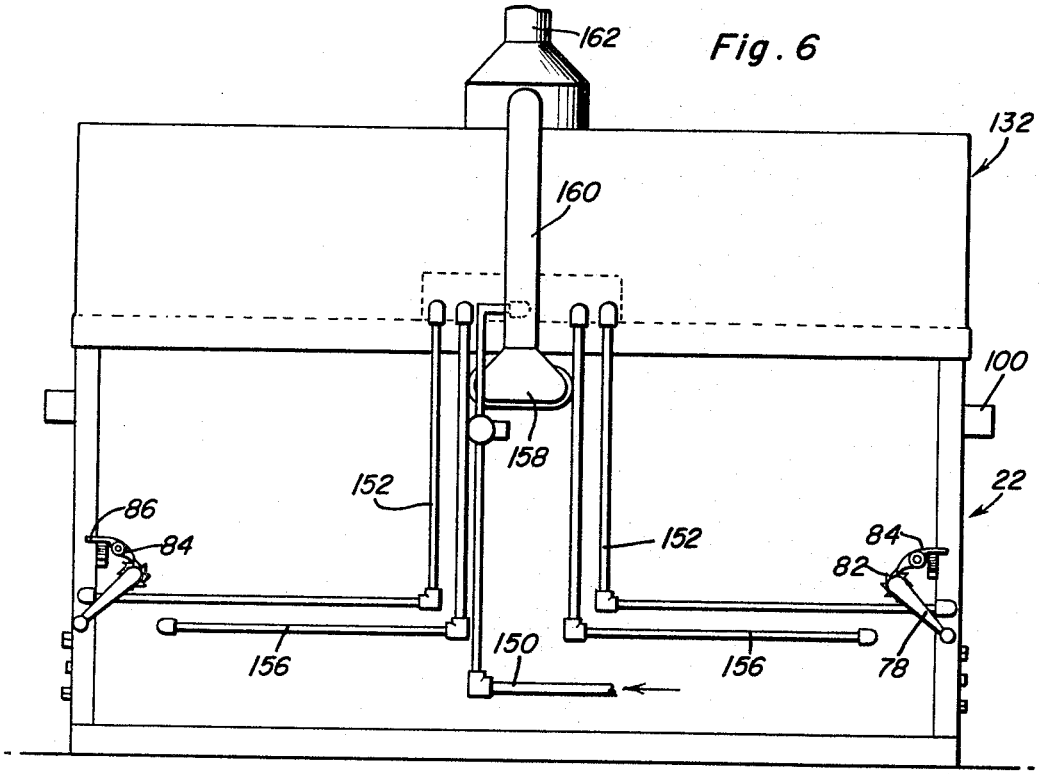
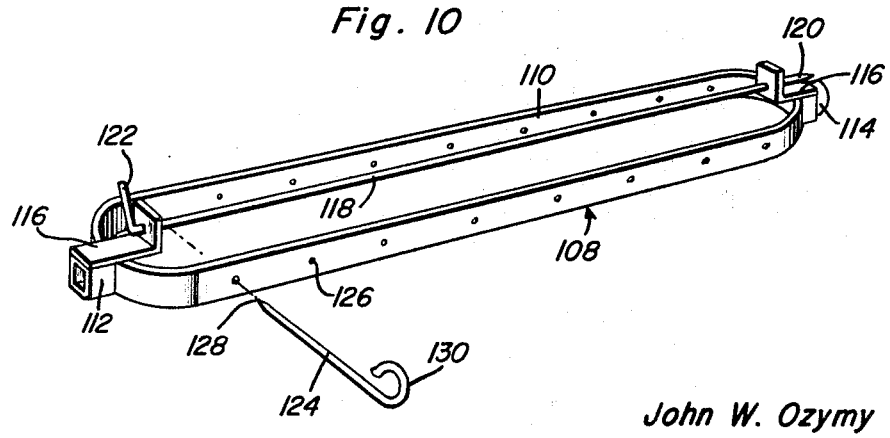

United States Patent Office
3,327,616
Patented June 27, 1967

3,327,616
BARBECUE OVEN
John W. Ozymy, 3105 Live Oak, Dallas, Tex. 75204
Filed Nov. 13, 1964, Ser. No. 410,874
10 Claims. (Cl. 99—339)

The present invention is generally concerned with ovens, and more particularly relates to new and useful improvements in barbecue ovens.

It is a primary object of the instant invention to provide a barbecue oven which is capable of automatically and efficiently barbecuing meats whether rotisserie mounted or positioned on flat grills.

In conjunction with the above object, it is a significant object of the instant invention to provide means for subjecting the meat, during the barbecuing operation, to wood smoke, for example hickory, so as to introduce a highly desirable flavor to the barbecued meat.

Further, it is an important object of the instant invention to provide external controls for regulating all of the operations of the oven including the degree of heat, the cooking period, and generally the amount of smoke to which the meat is subjected.

Likewise, it is an object of the instant invention to provide an oven wherein the heat receiving portion thereof is so constructed as to alternatively receive either flat grills or powered rotisseries.

In addition, it is an object of the instant invention to provide an oven having an arrangement of all of the components therein so as to provide a maximum amount of internal usable space within a reasonably compact housing.

Basically, in order to achieve the last-mentioned object, it is intended that the oven of the instant invention include a relatively elongated vertical insulated housing. The heat for effecting the barbecuing of the meat is to be provided by a pair of gas burners horizontally oriented at opposite ends of the interior of the housing, the heat therefrom rising upwardly, through inwardly inclined grease baffles, to the upper portion of the housing which forms the meat receiving chamber. In the meat receiving chamber, support means are provided for alternately receiving two tiers of flat grids or a pair of motor driven rotisseries, access to this meat receiving chamber being through an inclined front wall having sliding door panels. The portion of the housing between the gas burners is provided with an enlarged inwardly and forwardly directed grease trough which, in conjunction with the grease baffles over the heating elements, receives and directs the grease into a removable grease pan located below the oven. The smoke or wood flavor is derived from logs received within a pair of wood pans located beneath the burners and mounted for vertical adjustment relative thereto. Finally, an enlarged hood is mounted over the upper end of the oven housing and includes a light, orientated forwardly over the inclined doors for lighting the interior of the meat chamber when the doors are open, and the automatic controls which regulate and time the gas flow in order that both the cooking time and intensity of the cooking heat might be automatically set, thereby freeing the user of the device for other tasks. Incidentally, it will also of course be appreciated that a suitable exhaust flue, incorporating an exhausting fan, is to be provided.

The final object to be specifically enumerated is to provide a unique rotisserie construction which features a positive mounting of the meat such as would be required in a device which is to automatically carry out the barbecuing process.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged vertical sectional view through the barbecue oven;

FIGURE 3 is a cross-sectional view taken substantially on the plane passing along line 3—3 in FIGURE 2;

FIGURE 6 is a rear elevational view of the barbecue oven;

FIGURE 9 is a partial horizontal cross-sectional view illustrating the meat chamber with the two rotisseries mounted therein; and FIGURE 10 is a perspective view of the spit unit of one of the rotisseries.

Figure 7:
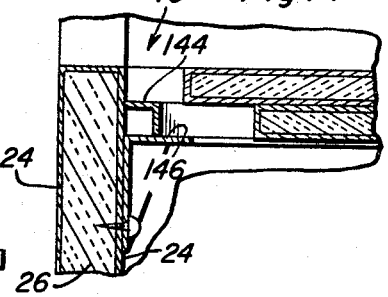
FIGURE 7 is an enlarged cross-sectional view taken substantially on the plane passing along line 7—7 in FIGURE 4.

Referring now more specifically to the drawings, reference numeral 20 is used to generally designate the barbecue oven comprising the instant invention. The oven 20 includes an elongated rectangular housing 22 constructed of interconnected insulated panels having inner and outer stainless steel skins sealing a suitable heat insulating material therein. This is possibly best seen in FIGURE 7 wherein reference numeral 24 designates the thin stainless steel skins while reference numeral 26 designates the enclosed insulation.

The housing 22 includes a flat bottom panel 28, vertical front and rear panels 30 and 32, vertical side panels 34, a horizontal top panel 36, and a pair of by-pass door panels 38 allowing access to the interior of the housing 22. As will be appreciated from the drawings, the front panel or wall 30 is of a height approximately one-half the height of the rear panel or wall 32 with the sliding door panels 38 being set into an inclined frame 40 which extends upwardly and rearwardly from the upper end of the front wall 30 to the forward edge of the top panel 36, this top panel 36 being offset rearwardly from the front panel 30 and of a width slightly greater than one-half of the width of the bottom panel 28. The enclosure defined by these panels forms the interior of the oven 20 with this interior consisting basically of full length vertically aligned upper and lower chambers, the upper chamber receiving the meat to be barbecued while the lower chamber contains the heating, smoking and grease removing apparatus.

Located in the lower portion or chamber of the housing 22 at approximately mid-height adjacent each end thereof is a flat gas burner 42, each of a length equal to a major portion of the width of the housing enclosure. The grease trough 44 extends between approximately the inner ends of the gas fired burners 42 and the front and rear panels 30 and 32 and consists of two compound sloped faces 46 sloping both toward the transverse center of the housing 22 and simultaneously toward the front wall 30 so as to direct any grease dripping from the upper meat chamber both toward a centrally located channel portion 48 and to a discharge spout 50 located at the forward end of this discharge channel 48 immediately behind the front panel 30, this spout 50 communicating with a removable pan 52 slidably positionable, from the front of the oven 20, beneath the lower panel 28. As will be noted in FIGURE 2, a pair of guiding angles 54 can be secured to the lower face of the bottom panel 28 for properly orientating the grease pan 52.

Further, so as to prevent any grease dripping on the burners 42, it will be noted that a pair of stepped grease baffles 56 have been provided above each of the burners 42. Each of the baffles 56 extends between and is fixed to the front and rear wall panels 30 and 32 by laterally directed mounting flanges 58. Further, referring specifically to FIGURE 2, it will be noted that both grease baffles 56 are downwardly arced toward the centrally located grease trough 44 with the upper baffle being located outwardly of the lower baffle and overlapping the lower baffle, in spaced relation thereabove, in a manner so as to direct any drippage thereon onto the lower baffle for subsequent discharge on the sloping adjoining face of the grease trough 46. Further, it will be noted that the baffles are both spaced from each other and from the grease trough in a manner so as to not generally interfere with the flow of heat and smoke to the upper meat compartment immediately thereabove.

Located immediately below each of the burners 42 is an elongated rectangular carrier 60 which is to receive a removable wood pan 62. The carrier 60 includes two high peaked end walls 64 and two elongated side walls 66 having, in each instance, a depressed or recessed portion 68 which facilitates the placing of the relatively shallow flat wood pan 62 therein, this pan having suitable carrying handles 70 along the opposite sides thereof. The peaked end walls 64 of each of the carriers 60 have elongated flexible link chains or cables 72 extending therefrom to an elongated rod 74 located above the corresponding burner 42 and rotatably mounted, at one end, within a suitable bearing 76 fixed to the inner face of the front wall 30, and, at the other end thereof, projecting through the rear wall 32 and having an enlarged crank handle 78 affixed thereto. The carrier 60 is of a length so as to position the chains or cables 72 laterally of the ends of the corresponding burner 42, these chains or cables of course being affixed to the rotatably mounted rod 74 for winding thereon so that the carrier 60 might be vertically adjusted through a rotation of the external handle 78. In order to maintain the carrier 60 in a vertically adjusted position, along with the load of wood 80 therein, a ratchet wheel 82 is fixed to the projecting portion of the rod 74 inward of the handle 78 with this ratchet wheel 82 being selectively engaged by a pivotally mounted pawl 84 provided on panel 32 so as to allow for a one-way rotation of the rod 74. Release of the pawl 84, for example when one wishes to lower the carrier 60, is effected by merely exerting counterbalancing pressure on the rearwardly extending finger or lug 86 of the pawl 84. Access is obtained to each end of the oven housing 22, for the placing of the wood pans 62 within the carrier 60, through pivotally mounted doors 88 in the end panels or walls 34, a suitable latch 90 being provided in conjunction with each of these doors 88. By providing for the vertical adjustment of the wood 80 relative to the burners 42, it will be appreciated that the rate at which the wood 80 is consumed, and the amount of smoke produced, can be regulated so as to insure the introduction of the desired smoked flavoring into the meat, the vertically adjustable carriers 60 also allowing the wood 80 to be progressively brought closer to the burners 42 as the wood is consumed.

Figure 1:
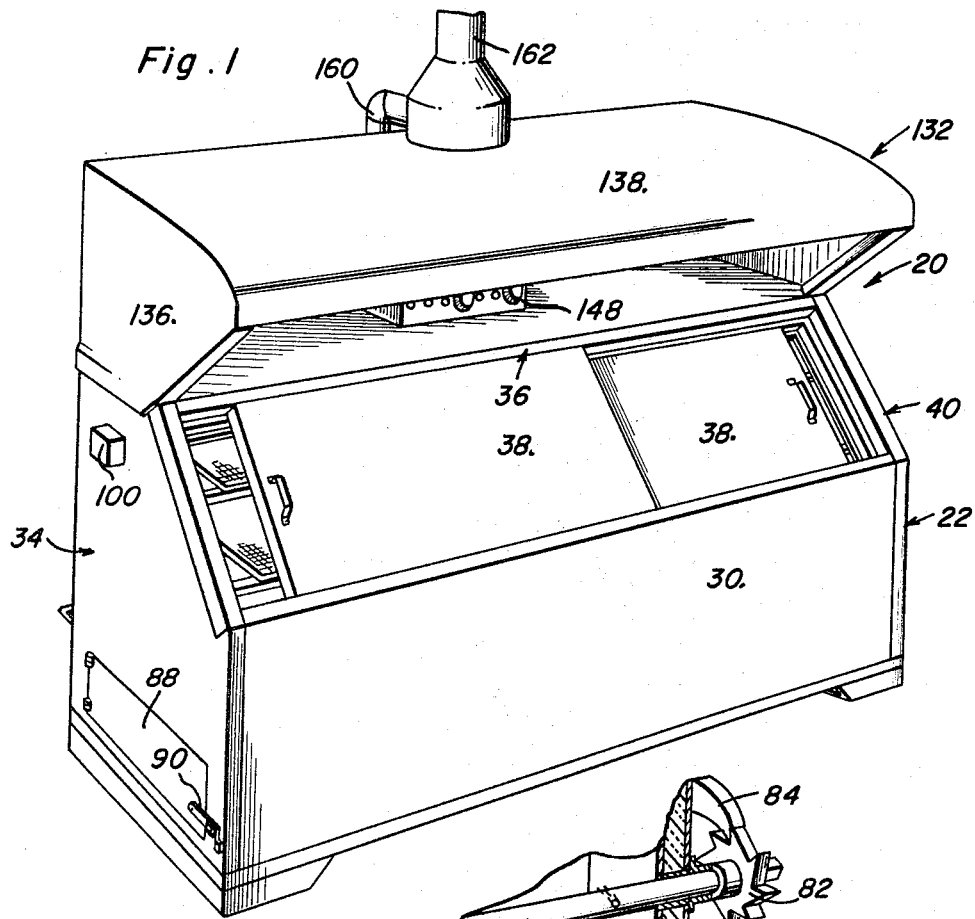
FIGURE 1 is a perspective view of the barbecue oven of the instant invention.
Figure 8:
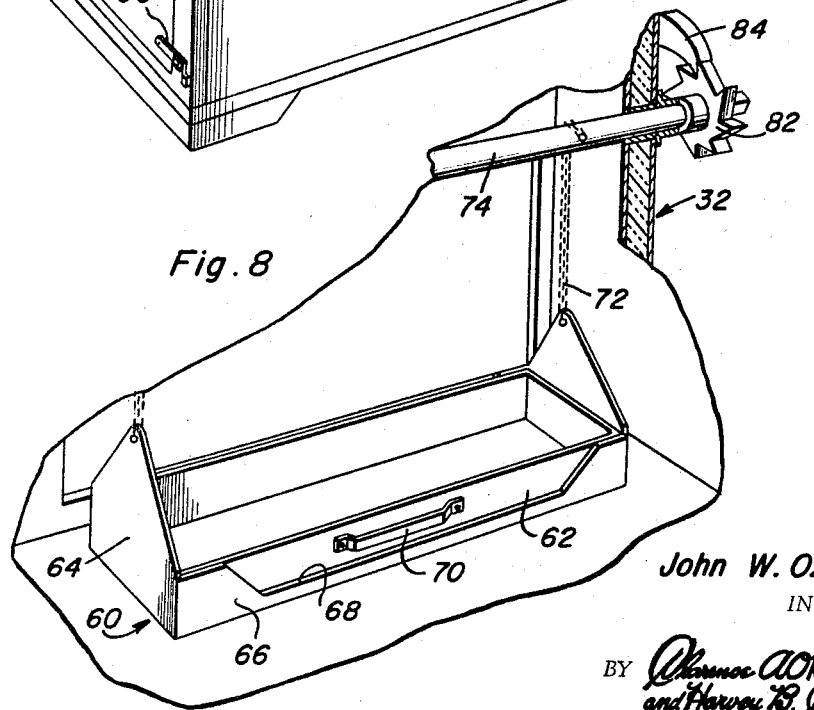
FIGURE 8 is a partial perspective view illustrating the wood pan and the control means therefor.
Figure 4:
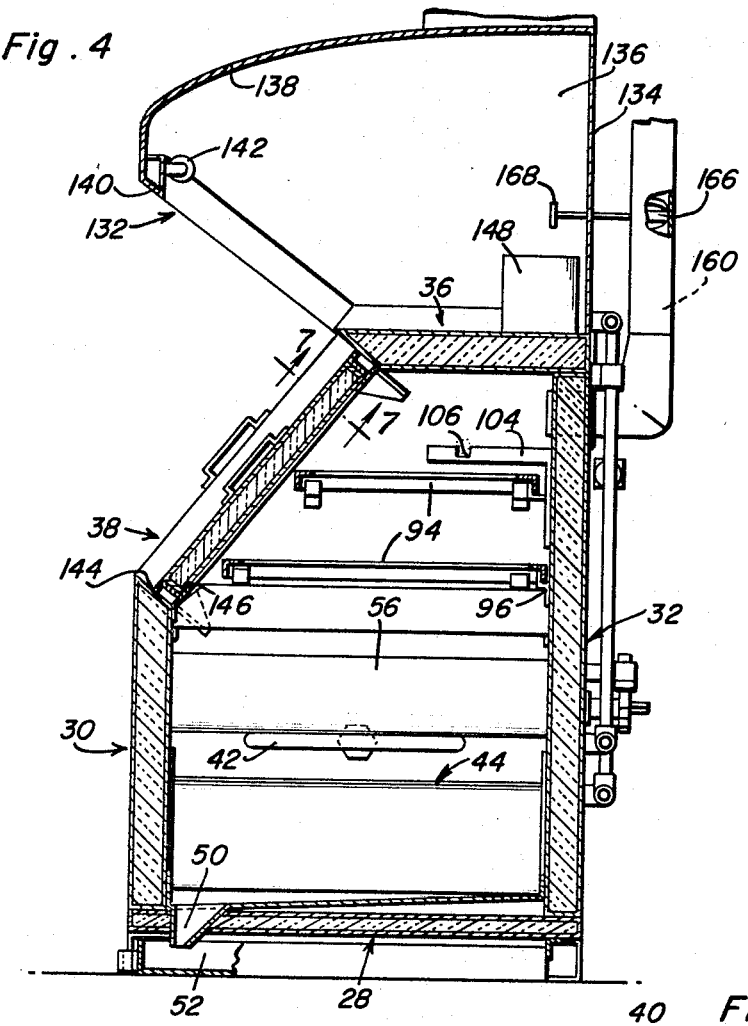
FIGURE 4 is a vertical transverse cross-sectional view taken substantially upon the plane passing along line 4—4 in FIGURE 2.
Figure 5:
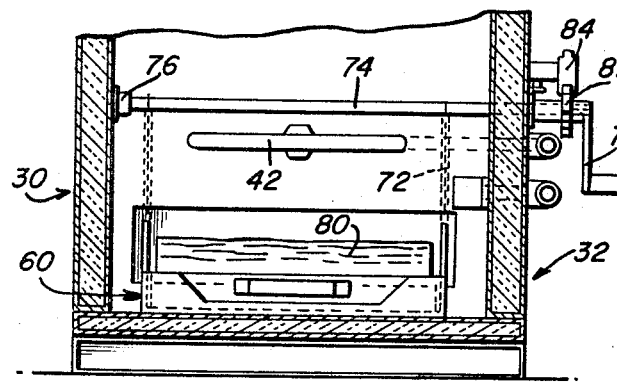
FIGURE 5 is a partial cross-sectional view taken substantially on the plane passing along line 5—5 in FIGURE 2.

The upper or meat chamber portion of the housing 22, commencing above the upper grease baffles 56, is to accommodate two vertical tiers of flat grills 92 orientated so as to be directly accessible through the side sliding door panels 38. The tiers are to consist of, in addition to a plurality of removable flat grills 92 on each tier, elongated rectangular frames 94 of a length and width corresponding to the interior of the housing within the meat chamber portion thereof, the upper tier of course being narrower than the lower tier due to the inclination of the sliding doors 38, this being best noted in FIGURE 4. Each of the frames 94 is supported along the rear and sides thereof by a plurality of inwardly projecting stepped brackets 96 fixed to the inner face of the rear panel 32 and the inner faces of the side panels 34, these frames 94 of course being removable by merely vertically lifting them off of the retaining brackets 96 in a manner which will be obvious from the drawings. These frames 94, in order to not interfere with the flow of heat through and by the grill members 92, are of course completely open, consisting only of four right angularly related peripheral members which support the grills 92 about the outer edges thereof.

It is also contemplated that the meat receiving chamber of the housing 22 have, removably mounted therein as an alternative to the tiers of grills 94, a pair of coaxially aligned rotisserie units 98. Accordingly, the housing 22 is provided with a pair of rotisserie drive motors 100 mounted on the side walls 34 with the drive shafts 102 thereof projecting into the interior of the meat receiving portion of the housing 22. In addition, projecting laterally or horizontally into the interior of the housing from the rear wall 32 at substantially the same height as the motor units 100 is a centrally located support bar 104 including a pair of bearing recesses 106 which are to receive the inner ends of the two spit units 108.

The spit units 108, as will be best appreciated from FIGURE 10, are each provided with an oblong flat frame 110 constructed of a stainless steel bar and including, at the outer end thereof, a stub 112 rigidly though releasably engaged with the corresponding motor drive shaft 102 in any conventional manner whereby an activation of the motor 100 will result in a corresponding rotation of the spit unit 108, the opposite end of the frame 110 being provided with a cylindrical stub 114 rotatably received within the corresponding bearing notch 106 in the support bar 104. In order to secure the meat to the spit unit 108, a pair of angle members 116 are fixed to the opposite ends of the frame 110 with one leg thereof projecting vertically so as to receive the opposite ends of an elongated skewer or meat-piercing rod 118, this rod 118 having a sharpened end 120 and a handle forming laterally bent end 122. In addition, in order to positively lock the meat in position on the spit unit 108, a plurality of transversely extending pins 124 are provided and projected through pairs of transversely aligned apertures 126 in the frame bar 110, these pins 124 having a meat-piercing pointed end 218 and a reversely bent hooked end 130 for releasably clipping over the adjoining frame edge. Incidentally, inasmuch as both of the rotisserie units are independently mounted and driven, it will be appreciated that they can be operated individually as well as simultaneously. Further, the motors 100 and central support bar 104 are mounted just above the upper grill tier thus making it possible, if so desired, to utilize the rotisserie units 98 and the lower grill tier simultaneously.

Mounted on the top of the housing portion 22 of the oven 20 is an enlarged hood 132 which includes sheet metal rear and side panels 134 and 136 generally coplanar with the housing rear and side panels 32 and 34. The top panel 138 of the hood 132, also of sheet metal, preferably stainless steel, curves downwardly and forwardly to a forward edge substantially in the vertical plane of the front panel 30 of the housing 22 with this front edge being reversely bent as at 140 and providing suitable bracket means for the mounting of one or more elongated fluorescent illuminating tubes 142. The side panels 136 of course project forwardly into engagement with the forward edge of the top panel 138 so as to provide a complete enclosing of the sides of the hood 132.

As will be appreciated, the hood 132, constructed in this manner, provides a cover or shield over the top of the housing 22, and at the same time orientates the illuminating of lighting means 142 directly over the sliding door panels 38 so as to illuminate the interior of the housing, and particularly the upper portion or meat receiving chamber, when one or the other of the sliding doors 38 are open. Incidentally, with regard to the sliding panels 38, it will be appreciated that the frame 40 therefore includes stepped supporting shoulders 144 and 146 with the lower door panel 38 being slightly smaller than the upper door panel 38 and supported on the lower shoulder 146 while the upper panel is slidably mounted directly thereover on the upper shoulder 144.

The control unit 148 is protectively mounted at the rear of the hood 132 on the upper housing panel 36 and includes an automatic timer, a thermostat, switches for the electric lights 142, the rotisserie controls, the gas controls, and any other controls deemed necessary to the complete automatic operation of the device. As will be appreciated from FIGURE 6, the various gas lines are communicated with the control panel or box 148, reference numeral 150 designating the main gas supply line which initially introduces the gas to the control box 148 for regulated distribution to the burners 42 through the lines 152 along with a controlled discharge to a pair of pilot lights 154, one associated with each burner 42, through the lines 156.

The heat and smoke generated within the oven housing 22 flows upwardly into the meat receiving chamber, and then centrally to an enlarged vented outlet 158 through the back panel 32 adjacent the upper end thereof. This vented opening 158 is communicated, through a vertical vent pipe 160, to a vertical flue 162 communicated with the interior of the hood 132 through the top thereof. This flue 162 has a suitable air exhausting means, for example an exhaust fan 164 mounted therein just above the point of communication with the interior of the hood 132 so as to draw cool air in through the open front end of the hood 132 for effecting a cooling of the vented heat and smoke introduced above the fan 164 by the vent pipe 160. Incidentally, it will also be appreciated that the location of the main flue in this manner will also help to dissipate any heat which might rise through the open door panels 38 in the event it is deemed desirable to keep these doors open. The actual flow through the vent 160 is to be controlled by a rotatably mounted damper 166 therein, the rotation of which is controlled from the interior of the hood 132 by means of an elongated handle 169 projecting through the rear panel 134 of the hood 132.

From the foregoing, it will now be appreciated that a highly significant advance has been made in the art of barbecuing, the device of the instant invention enabling the automatic barbecuing and smoke flavoring of either grill or rotisserie supported meats in both a convenient and simplified manner. In achieving this, the barbecue oven of the instant invention has been compactly constructed with the meat receiving or cooking chamber being readily accessible through enlarged sliding doors mounted in an inclined upwardly facing wall, the heating and smoking elements being located directly below the meat chamber and having various grease disposing means associated therewith in a manner so as to insure a proper heating and smoking of the meat in conjunction with a convenient disposal of any grease drippage which will occur. Likewise, as will be appreciated from the above detailed description, unique means have been provided for positioning the smoking wood and regulating its orientation relative to the gas burners so as to insure the production of the necessary amount of smoke, and at the particular rate deemed most proper.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A barbecue oven comprising interconnected vertical panels defining an elongated enclosure, said enclosure including an upper meat receiving chamber and a lower chamber, said chambers being vertically aligned, a heating unit mounted at each end of the lower chamber, an enlarged grease trough extending between said heating units, grease deflecting means located vertically above each heating unit for deflecting drippage centrally toward the trough and away from said heating units, an exhaust vent communicated with the center of the upper chamber adjacent the top thereof, said vertical panels including a rear panel corresponding in height to the combined height of the two chambers, and a front panel of a height generally equal to the height of the lower chamber, a horizontal top panel projecting forwardly from the upper edge of the rear panel and terminating rearward of the vertical plane of the front panel, an inclined door frame extending from the upper edge of the front panel to the forward edge of the top panel, and a pair of inclined doors mounted in said frame for selectively exposing the full height of the meat receiving chamber without exposing the lower chamber.

2. The structure of claim 1 including a hood mounted on said elongated enclosure and projecting forwardly from the rear panel into vertically spaced overlying relation to the inclined doors, said hood having the forward edge thereof located in general alignment with the front panel.

3. The structure of claim 2 including a wood carrier located beneath each heating unit, and means for vertically adjusting each carrier upwardly toward and downwardly away from the corresponding heating unit.

4. The structure of claim 3 wherein the means for vertically adjusting each carrier comprises an elongated rod extending transversely across the enclosure above the carrier, said rod being rotatably mounted and projecting through one wall, flexible cable means fixed to the rod and the carrier, said cable being windable on said rod upon a rotation thereof so as to effect a raising of the carrier, and external handle means on said rod for effecting a rotation thereof.

5. A barbecue oven comprising interconnected vertical panels defining an elongated enclosure, said enclosure including an upper meat receiving chamber and a lower chamber, said chambers being vertically aligned, a heating unit mounted at each end of the lower chamber, an enlarged grease trough extending between said heating units, grease deflecting means located vertically above each heating unit for deflecting drippage centrally toward the trough and away from said heating units, a wood carrier located beneath each heating unit, and means for vertically adjusting each carrier upwardly toward and downwardly away from the corresponding heating unit.

6. The structure of claim 5 wherein the means for vertically adjusting each carrier comprises an elongated rod extending transversely across the enclosure above the carrier, said rod being rotatably mounted and projecting through one wall, flexible cable means fixed to the rod and the carrier, said cable being windable on said rod upon a rotation thereof so as to effect a raising of the carrier, and external handle means on said rod for effecting a rotation thereof.

7. The structure of claim 3 wherein said upper chamber includes plural tiers of grill supporting means, a pair of horizontally aligned rotisserie supports, a pair of rotisserie units mounted on the rotisserie supports, each of said units including a motor mounted on the exterior of a side panel of the enclosure, and a spit unit projecting longitudinally in the meat receiving chamber, said spit unit being operatively engaged with the motor and comprising an oblong open frame including laterally spaced opposed bar-like portions, an elongated meat piercing rod mounted longitudinally on said frame generally between said portions, and a plurality of meat locating pins extending transversely between and being releasably fixed to said bar-like frame portions, said rotisserie support including an inwardly extending bearing support fixed to the rear panel and rotatably receiving the inner ends of the spit units.

8. The structure of claim 2 including a flue extending vertically from a central portion of said hood and communicating with the space between said hood and the upper cabinet located in spaced relation therebelow, said exhaust vent extending from communication with said upper chamber into communication with said flue above the hood mounted end thereof, and an exhaust fan mounted within said flue adjacent said hood for the inward drawing of air from beneath said hood and an exhausting thereof in conjunction with the exhaust vent introduced air upwardly through said flue.

9. A barbecue oven comprising interconnected vertical panels defining an elongated enclosure, said enclosure including an upper meat receiving chamber and a lower chamber, said chambers being vertically aligned, a heating unit mounted at each end of the lower chamber, an enlarged grease trough extending between said heating units, grease deflecting means located vertically above each heating unit for deflecting drippage centrally toward the trough and away from said heating units, said upper chamber including plural tiers of grill supporting means, a pair of horizontally aligned rotisserie supports, a pair of rotisserie units mounted on the rotisserie supports, each of said units including a motor mounted on the exterior of a side panel of the enclosure, and a spit unit projecting longitudinally in the meat receiving chamber, said spit unit being operatively engaged with the motor and comprising an oblong open frame including laterally spaced opposed bar-like portions, an elongated meat piercing rod mounted longitudinally on said frame generally between said portions, and a plurality of meat locating pins extending transversely between and being releasably fixed to said bar-like frame portions, said rotisserie supports including an inwardly extending bearing support fixed to the rear panel and rotatably receiving the inner ends of the spit units.

10. A barbecue oven comprising interconnected vertical panels defining an elongated enclosure, said enclosure including an upper meat receiving chamber and a lower chamber, said chambers being vertically aligned, a heating unit mounted at each end of the lower chamber, an enlarged grease trough extending between said heating units, and grease deflecting means located vertically above each heating unit for deflecting drippage centrally toward the trough and away from said heating units, said grease deflecting means comprising a pair of grease baffles located in vertically spaced relation to each other and to the corresponding heating unit so as to define an upper baffle and a lower baffle, said upper baffle being laterally offset from said lower baffle so as to define a relatively short overlapping relation therebetween, said baffles both being generally inclined downward toward said enlarged grease trough, said upper baffle being located in inwardly spaced relation to the adjacent end panel with the lower baffle being inwardly offset relative to the upper baffle so as to extend over said grease trough in upwardly spaced relation thereto whereby a positive grease deflecting means is provided in conjunction with passages therethrough for the free flow of the heated air.

References Cited

UNITED STATES PATENTS

| | | |
|---|---|---|
| 600,621 | 3/1898 | Riess. |
| 1,765,247 | 6/1930 | Seegmuller _____ 99—421 X |
| 2,247,626 | 7/1941 | Ames. |
| 2,744,994 | 5/1956 | Bruckner et al. |
| 2,868,108 | 1/1959 | Petersen. |
| 2,994,572 | 8/1961 | Morrison _____ 312—116 |
| 2,996,597 | 8/1961 | Persinger et al. ____ 126—25 X |
| 3,010,383 | 11/1961 | Greene _____ 99—349 X |
| 3,019,720 | 2/1962 | Topper _____ 99—421 X |
| 3,049,073 | 8/1962 | Edelston _____ 99—421 X |
| 3,154,004 | 10/1964 | Huck _____ 99—390 |

WALTER A. SCHEEL, *Primary Examiner.*

S. P. FISHER, *Assistant Examiner.*